Patented May 29, 1923.

1,456,594

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING SODIUM-SILICO FLUORIDE.

No Drawing. Application filed April 3, 1922. Serial No 549,208

*To all whom it may concern:*

Be it known that I, HENRY HOWARD, a citizen of the United States, residing at Cleveland, in the county of Cuyahoga and State of Ohio, have invented certain new and useful Improvements in Processes of Making Sodium-Silico Fluoride, of which the following is a specification.

This invention relates to a process for the production of sodium silico fluoride.

In the usual process for the manufacture of sodium phosphate, either the mono, di, or tri sodium phosphate, ground phosphate rock is acidulated with sulfuric acid, the resulting solution of phosphoric acid and residue of calcium sulfate are separated, and the phosphoric acid solution is treated with an alkali, usually sodium carbonate or soda ash, whereby sodium phosphate is formed and the impurities in the solution are precipitated. This precipitate contains insoluble iron, aluminum and fluorine compounds, and sodium and phosphate compounds carried down with the precipitate. Heretofore the precipitate has been sold to fertilizer manufacturers at a price based upon its phosphate content. The fluorine content of the precipitate has been assumed to be in the form of artificial cryolite and has been regarded as not only valueless but as an impurity or diluent of the phosphate content of the precipitate.

I have discovered that the fluorine content of the crude phosphoric acid solution is not precipitated in the form of artificial cryolite but in the form of sodium silico fluoride and that this material may be obtained in pure form available for use in the manufacture of white enamels, etc., by the process hereinafter described.

According to my process crude phosphoric acid solution containing fluorine compounds such as that formed by acidulating phosphate rock with sulfuric acid is only partially neutralized with sodium carbonate.

I have found that if the usual procedure for the manufacture of sodium phosphate is followed, sodium carbonate at least sufficient to form the mono sodium phosphate being added to the crude phosphoric acid solution, iron and aluminum compounds are precipitated along with the sodium silico fluoride, thus rendering the sodium silico fluoride impure whereas if sodium carbonate in quantity less than sufficient to form the mono sodium phosphate is added to the crude phosphoric acid solution, for instance, only three fourths of an amount necessary to form the mono sodium phosphate, the precipitate of sodium silico fluoride is relatively pure. If the sodium carbonate added to the crude phosphoric acid solution is limited to one half the quantity necessary to form the mono sodium phosphate the precipitate of sodium silico fluoride is substantially free from iron and aluminum compounds and corresponds in purity with the commercial product. Smaller quantities of sodium carbonate may be used and a pure precipitate obtained but I prefer to use at least 50 per cent of the quantity necessary to form the mono sodium phosphate in order to reduce the acidity of the resulting reaction mixture and thus facilitate the handling of the reaction mixture, for instance the filtration, to separate the sodium silico fluoride from the mother liquor.

The sodium silico fluoride precipitate is separated from the mother liquor and is washed with water and dried.

The invention is not limited to the use of sodium carbonate. Other alkaline compounds of sodium such as sodium oxid, hydroxid and bicarbonate and alkaline compounds of other metals which form soluble salts with phosphoric acid and insoluble salts with fluosilicic acid such as compounds of potassium may be employed. The invention is not limited to the use of three fourths or one half or less than one half the quantity of alkali necessary to convert the phosphoric acid in the crude solution to the mono alkali metal salt. The essential characteristic in this respect is that enough alkali be added to the solution to precipitate the silico fluoride preferably the bulk of it, substantially free from impurities, principally iron and aluminum compounds. To avoid the precipitation of iron and aluminum compounds along with the silico fluoride the crude solution must be left sufficiently acid to keep the iron and aluminum compounds in solution.

It will be seen that by this invention what was formerly a valueless constituent of the residue from the manufacture of sodium phosphate is made into an article of value and the manufacture of sodium phosphate is improved by reducing the amount of phosphate lost in the precipitate formed when the crude phosphoric acid solution is neutralized and the dilution of the phosphate content of this precipitate by sodium silico fluoride is avoided.

I claim:

1. Process of making alkali silico fluorides which comprises acidulating phosphate rock with sulfuric acid, separating the resulting solution from insoluble material, adding to the solution an alkali in quantity insufficient to convert the phosphoric acid in the solution to the mono alkali salt, and recovering the resulting precipitate of alkali silico fluoride.

2. Process of making alkali silico fluorides which comprises precipitating an alkali silico fluoride from a crude solution containing fluosilicic acid, iron and aluminum compounds, and maintaining said solution acid during the precipitation whereby precipitation of iron and aluminum compounds with the silico fluoride is avoided.

3. Process of making sodium silico fluoride substantially free of impurities from crude phosphoric acid solutions formed by acidulating phosphate rock which comprises adding an alkaline sodium compound to said solution in quantity not more than 75 percent of the quantity necessary to form the mono sodium salt of phosphoric acid whereby sodium silico-fluoride substantially free from iron and aluminum compounds is precipitated, and separating the precipitate from the reaction mixture.

4. Process of making sodium silico fluoride which comprises acidulating phosphate rock with sulfuric acid, treating the resulting crude phosphoric acid solution with sodium carbonate in quantity insufficient to convert the phosphoric acid in the solution to the mono sodium salt, and recovering the resulting precipitate.

5. Process of making sodium silico fluoride which comprises adding to a crude solution of phosphoric acid such as may be obtained by acidulating phosphate rock with sulfuric acid from 50 to 75 per cent of the amount of sodium carbonate required to form mono sodium phosphate, and recovering the resulting sodium silico fluoride precipitate.

In testimony whereof, I affix my signature.

HENRY HOWARD.